Figure 1:
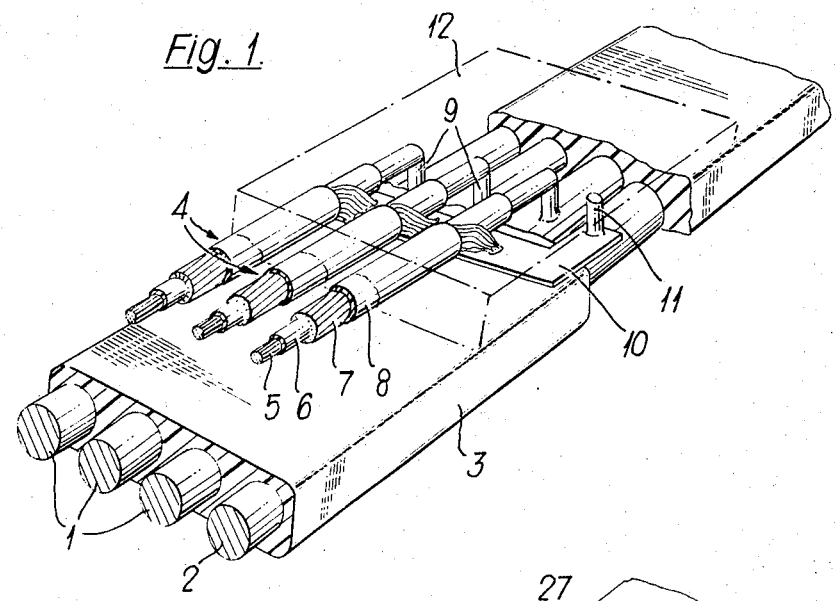

United States Patent [19]

Higgins

[11] 3,806,628

[45] Apr. 23, 1974

[54] DISTRIBUTION CABLE WITH PERMANENTLY CONNECTED FLEXIBLE CABLES

[75] Inventor: Peter Higgins, Hounslow, England

[73] Assignee: British Insulated Callender's Cables Limited, London, England

[22] Filed: May 2, 1973

[21] Appl. No.: 356,330

[30] Foreign Application Priority Data
May 4, 1972   Great Britain.................20890/72

[52] U.S. Cl.............. 174/72 R, 29/628, 174/71 C, 174/112
[51] Int. Cl. .......................... H01r 3/02, H01b 9/00
[58] Field of Search...... 174/71 R, 72 R, 88 R, 112; 29/628; 156/49; 307/147

[56] References Cited
UNITED STATES PATENTS
2,941,026   6/1960   Lambert............................ 174/71 R FOREIGN PATENTS OR APPLICATIONS
1,133,266  11/1968   Great Britain ................... 174/71 R
476,378    9/1969   Switzerland...................... 174/72 R Primary Examiner—Laramie E. Askin
Attorney, Agent, or Firm—Buell, Blenko & Ziesenheim

[57] ABSTRACT

A distribution cable comprises a number of bare electric power conductors and a bare neutral conductor embedded in and mutually insulated by a single body of rubber or plastic insulating material extending throughout the length of the cable. Permanently electrically connected to a power conductor and to the neutral conductor of the distribution cable at each of a number of spaced locations along its length before it is installed is a branch cable, separate conductors, or other flexible means suitable for connecting said power and neutral conductors to the corresponding conductors of a consumer service cable or to terminals of a fuse cut-out box or other installation accessory. Each of the flexible connecting means is at least partially embedded in a protective insulating covering bonded to the body of the insulating material. Preferably the neutral conductor is a core conductor and the power and neutral conductors are arranged substantially to lie with their axes in a common plane.

15 Claims, 2 Drawing Figures

PATENTED APR 23 1974 3,806,628

DISTRIBUTION CABLE WITH PERMANENTLY CONNECTED FLEXIBLE CABLES

In local distribution of power to consumers, for example in houses, factories or blocks of flats or offices, it is the general practice to employ single or multi-phase branch cables, referred to as consumer service cables, each of which during its installation is connected at one of its ends at a service joint box to an electric power distribution cable and is connected at its other end to terminals of an installation accessory, normally located in the premises of the consumer, to which the consumer's installation is connected, for instance a fuse cut-out box housing the main fuse of the consumer's installation.

Where consumers are accommodated in a number of separate buildings, for example on housing or factory estates, generally a distribution cable is laid through the estate and at intervals along the length of the distribution cable consumer service cables extend from the distribution cable to the fuse cut-out boxes located in the houses or other buildings. Where consumers are accommodated in a number of flats or offices on each floor of a multi-storey block, it is the normal practice to install a distribution cable in a shaft or trunking extending upwardly within the block, generally referred to as a rising mains, and on each floor to connect to the rising mains service cables for connection to terminals of fuse cut-out boxes, each of which boxes may serve one or more consumers on the floor.

A large proportion of the total cost of providing a cable installation for local distribution of power to consumers results from the cost of the distribution cable itself and from the cost of installing consumer service cables arising from the time taken in effecting a joint between a service cable and the distribution cable and because such jointing must be carried out by skilled personnel.

An object of the present invention is to provide a relatively cheap distribution cable by means of which connections to terminals of the fuse cut-out boxes or other installation accessories of a plurality of consumers can be effected in a simple and efficient manner without the need for service joint boxes to be used and which, therefore, substantially reduces the overall cost of providing for local distribution of power to consumers.

According to the invention, the distribution cable comprises a number of bare electric power conductors and a bare neutral conductor embedded in and mutually insulated by a single body of rubber or plastic insulating material extending throughout the length of the cable and, permanently connected to the distribution cable at each of a number of spaced locations along its length before it is installed, flexible means electrically connected to a power conductor and to the neutral conductor of the distribution cable suitable for connecting said power and neutral conductors to the corresponding conductors of a consumer service cable or to terminals of a fuse cut-out box or other installation accessory, each of said connecting means being at least partially embedded in a protective insulating covering bonded to the body of insulating material.

The neutral conductor may comprise a plurality of conductor elements arranged to surround the electric power conductors but preferably it comprises a core conductor.

The bare power conductors, or where the neutral conductor is a core conductor the bare power and neutral conductors, may be of solid or of stranded form.

Preferably the bare power conductors, or where the neutral conductor is a core conductor the bare power and neutral conductors, are arranged substantially to lie with their axes in a common plane. A distribution cable of this form is especially, but not exclusively, suitable for use as a rising mains in a block of flats or offices.

The single body of insulating material may carry appropriate marking and/or insignia to indicate the approximate positions of the bare phase and neutral conductors within the insulating body.

The flexible connecting means permanently connected to the distribution cable at spaced locations along its length suitable for connecting power and neutral conductors of the distribution cable to corresponding conductors of a consumer service cable may take either of two different forms, the choice of which will be governed to some extent by the distribution installation of which the distribution cable is to form a part. In one embodiment of the invention said connecting means may comprise a branch cable comprising at least one power conductor which is connected to a bare power conductor of the distribution cable and a neutral conductor which is connected to the bare neutral conductor of the distribution cable. Two or more branch cables may be permanently connected to the distribution cable at the same location and in this case it is convenient to use a single covering of insulating material that surrounds and protects the connections made with both or all branch cables and is bonded to the body of insulating material of the distribution cable. The distribution cable will normally be a three phase cable and in this case each branch cable will generally, but not necessarily, be a single phase cable comprising a single power conductor and a neutral conductor. The neutral conductor of each branch cable may be in the form of an outer concentric conductor but preferably, and especially where the bare power and neutral conductors of the distribution cable are arranged to lie side-by-side, the neutral conductor of each branch cable is a core conductor and is arranged parallel with the power conductor. The power and neutral conductors of each branch cable may be bare and embedded in and mutually insulated by a single body of rubber or plastic insulating material extending throughout the length of the branch cable and this body may be appropriately coloured to identify that phase of the distribution cable to which it is connected.

Some or all of the branch cables may be of sufficient length to be used directly as service cables or alternatively they may be in the form of short lengths to which the service cables can be connected. For example, before the distribution cable is installed each of some or all of the branch cables may have permanently connected to its power and neutral conductors at its free end (that is the end not permanently connected to the distribution cable) one part of an insulated two-part connector suitable for connecting said power and neutral conductors to the corresponding conductors of a consumer service cable.

In a second embodiment of the distribution cable of the invention flexible connecting means suitable for connecting power and neutral conductors of the distribution cable to terminals of a fuse cut-out box or other installation accessory may comprise at least one flexible conductor which is connected to a bare power conductor of the distribution cable and a separate flexible conductor which is connected to the bare neutral conductor of the distribution cable, the said connections being wholly embedded in the protective insulating covering. The conductor or conductors connected to a bare power conductor or bare power conductors of the distribution cable and the separate conductor connected to the bare neutral conductor of the distribution cable may each be individually insulated by a body of rubber or plastic material, preferably appropriately coloured for identification purposes, or they may be bare and embedded in and mutually insulated by a single body of rubber or plastic material. In this latter case the single body of insulating material preferably carries appropriate marking and/or insignia to identify the bare conductors within the body. In use, the or each flexible conductor connected to a bare power conductor of the distribution cable will be connected to a phase terminal of a fuse cut-out box or other installation accessory and the single flexible conductor connected to the bare neutral conductor of the distribution cable will be connected to the neutral terminal of a fuse cut-out box or other accessory.

Distribution cables in accordance with the second embodiment of the invention are especially, but not exclusively, suitable for use as rising mains in blocks of flats or offices.

In all cases each connecting means may be permanently electrically and mechanically connected to a power or neutral conductor of the distribution cable by any convenient method but each is preferably so connected by welding.

Figure 2:
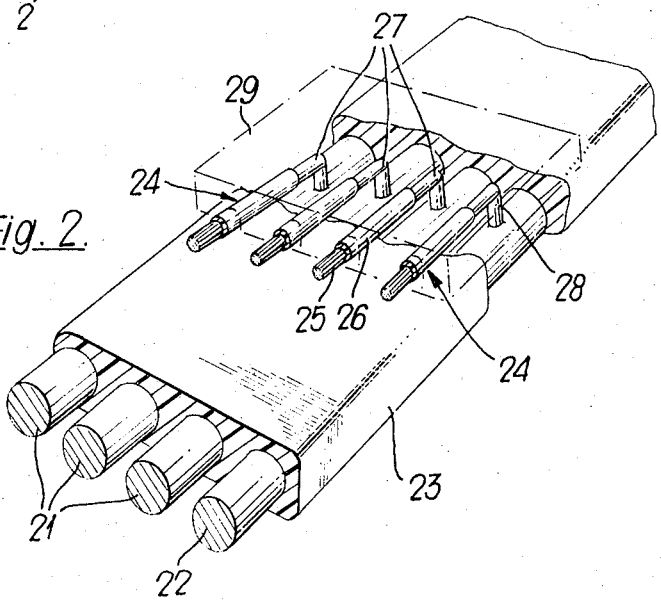

The invention will be further illustrated by a description, by way of example, of two forms of distribution cable suitable for use as rising mains in blocks of flats or offices with reference to the accompanying drawing, which shows in FIGS. 1 and 2 respectively a fragmental perspective view of each cable.

The distribution cable shown in FIG. 1 comprises three bare solid phase conductors 1 and a bare solid neutral core conductor 2 arranged substantially to lie with their axes in a common plane and embedded in and mutually insulated by a single body 3 of plastic insulating material. At each of a plurality of locations mutually spaced along the length of the cable a distance substantially equivalent to the distance between adjacent floors of the block of flats or offices three single phase branch cables 4 are connected to the distribution cable before it is installed. Each branch cable 4 comprises a power conductor 5, insulation 6, a concentric neutral conductor 7 and a sheath 8 of rubber or plastic material of a colour or carrying a marking appropriate to the phase to which the cable is connected. The power conductor 5 of each branch cable 4 is welded to a stud 9 which is itself welded to one of the phase conductors 1. The neutral conductor 7 of each branch cable 4 is welded to an L-shaped metal plate 10 which is welded to a stud 11 welded to the neutral conductor 2 of the distribution cable. The electrical connections between the conductors of the branch cable 4 and the conductors of the distribution cable are embedded in a protective covering 12 of plastic material which is integral with the body 3.

In use, the distribution cable is installed in trunking extending upwardly within the block of flats or offices with each location at which the branch cables are connected positioned at an outlet in the trunking feeding a floor of the block. Each branch cable is jointed to a service cable serving one or more consumers on the floor, the service cable being connected to the terminals of a fuse cut-out box.

The distribution cable shown in FIG. 2 is similar to that shown in FIG. 1 in that it comprises three bare solid phase conductors 21 and a bare solid neutral core conductor 22 embedded in and mutually insulated by a single body 23 of plastic insulating material but, in this case, at each of a plurality of spaced locations along the length of the distribution cable four insulated flexible conductors 24 are connected to the distribution cable before it is installed. Each insulated conductor 24 comprises a conductor 25 and insulation 26, three of these conductors being welded to studs 27 welded to the phase conductors 21 of the distribution cable and the fourth of these conductors being welded to a stud 28 welded to the neutral conductor 22 of the distribution cable. The insulation 26 of each insulated conductor 24 is of a colour appropriate to the phase or neutral conductor to which it is connected. The connections between the insulated conductors 24 and the conductors of the distribution cable are wholly embedded in a protective covering 29 of plastic material which is integral with the body 23.

In use, the distribution cable is installed in trunking extending upwardly within the block of flats or offices with each location at which insulated conductors are connected to it positioned at an outlet in the trunking feeding a floor of the block. Each insulated conductor 24 is connected directly to the appropriate terminal of a fuse cut-out box serving one or more consumers on the floor.

What I claim as my invention is:

1. As an article of manufacture a distribution cable comprising a number of bare electric power conductors and a bare neutral conductor embedded in and mutually insulated by a single body of insulating material extending throughout the length of the cable and, permanently connected to the distribution cable at each of a number of spaced locations along its length before it is installed, flexible connecting means electrically connected to a power conductor and to the neutral conductor of the distribution cable, each of said connecting means being at least partially embedded in a protective insulating covering bonded to the body of insulating material.

2. As an article of manufacture a distribution cable comprising a number of bare electric power conductors and a bare neutral core conductor arranged substantially to lie with their axes in a common plane and embedded in and mutually insulated by a single body of in-sulating material extending throughout the length of the cable and permanently connected to the distribution cable at each of a number of spaced locations along its length before it is installed, flexible connecting means electrically connected to a power conductor and to the neutral conductor of the distribution cable, each of said connecting means being at least partially embedded in a protective insulating covering bonded to the body of insulating material.

3. A distribution cable as claimed in claim 2, wherein the power and neutral conductors of the distribution cable are of solid form.

4. As an article of manufacture a distribution cable comprising a number of bare electric power conductors and a bare neutral conductor embedded in and mutually insulated by a single body of insulating material extending throughout the length of the cable and, permanently connected to the distribution cable at each of a number of spaced locations along its length before it is installed, at least one flexible conductor which is connected to a power conductor of the distribution cable and can be used for connection to the corresponding terminal of an installation accessory and a separate flexible conductor which is connected to the neutral conductor of the distribution cable and can be used for connection to the neutral terminal of the installation accessory, the connections between the said conductors and the power and neutral conductors of the distribution cable being wholly embedded in a protective insulating covering bonded to the body of insulating material.

5. A distribution cable as claimed in claim 4, wherein the conductor connected to a power conductor of the distribution cable and the separate conductor connected to the neutral conductor of the distribution cable at each of said locations are each individually insulated by a body of insulating material.

6. A distribution cable as claimed in claim 5, wherein the insulation of each conductor connected to a conductor of the distribution cable is appropriately coloured for identification purposes.

7. A distribution cable as claimed in claim 4, wherein the neutral conductor is a core conductor and the power and neutral conductors are arranged substantially to lie with their axes in a common plane.

8. A distribution cable as claimed in claim 4, wherein the power and neutral conductors of the distribution cable are of solid form.

9. As an article of manufacture a distribution cable comprising a number of bare electric power conductors and a bare neutral conductor embedded in and mutually insulated by a single body of insulating material extending throughout the length of the cable and, permanently connected to the distribution cable at each of a number of spaced locations along its length before it is installed, at least one branch cable comprising at least one power conductor which is connected to a power conductor of the distribution cable and a neutral conductor which is connected to the neutral conductor of the distribution cable, the connections between said power conductors and said neutral conductors being wholly embedded in a protective insulating covering bonded to the body of insulating material.

10. A distribution cable as claimed in claim 9, wherein the neutral conductor of the distribution cable is a core conductor and the power and neutral conductors are arranged substantially to lie with their axes in a common plane.

11. A distribution cable as claimed in claim 9, wherein the power and neutral conductors of the distribution cable are of solid form.

12. A distribution cable as claimed in claim 9, wherein at least two branch cables are permanently connected to the distribution cable at the same location, a single covering of insulating material surrounding and protecting the connections made with both branch cables and being bonded to the body of insulating material of the distribution cable.

13. A distribution cable as claimed in claim 9, wherein each branch cable is a single phase cable comprising a single power conductor and a neutral conductor.

14. A distribution cable as claimed in claim 13, wherein the power and neutral conductors of each branch cable are surrounded by a body of insulating material appropriately coloured to identify that phase of the distribution cable to which the branch cable is connected.

15. A distribution cable as claimed in claim 9, wherein the neutral conductor of each branch cable is in the form of a concentric conductor.

* * * * *